United States Patent
Kuo et al.

(10) Patent No.: US 10,444,853 B1
(45) Date of Patent: Oct. 15, 2019

(54) 3D DISPLAY WITH GESTURE RECOGNITION FUNCTION

(71) Applicant: ACER INCORPORATED, New Taipei (TW)

(72) Inventors: Jin-Ting Kuo, New Taipei (TW); Chia-Yu Sun, New Taipei (TW); Chao-Shih Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/034,363

(22) Filed: Jul. 13, 2018

(30) Foreign Application Priority Data

May 10, 2018 (TW) .............................. 107115893 A

(51) Int. Cl.
*G06F 3/01* (2006.01)
*G06T 7/20* (2017.01)
*G06T 19/20* (2011.01)
*G06T 7/521* (2017.01)

(52) U.S. Cl.
CPC .............. *G06F 3/017* (2013.01); *G06T 7/20* (2013.01); *G06T 7/521* (2017.01); *G06T 19/20* (2013.01); *G06T 2207/10048* (2013.01); *G06T 2219/2016* (2013.01)

(58) Field of Classification Search
CPC ........... G06T 7/521; G06T 2207/10048; G06T 2219/2016; G06T 19/003; G06F 3/017; G06F 3/0304; G06F 1/1698; G03H 2210/30; G03H 2001/0061; G08C 23/04
See application file for complete search history.

(56) References Cited

U.S. PATENT DOCUMENTS

| 2010/0225584 | A1 | 9/2010 | Cauchi | |
|---|---|---|---|---|
| 2010/0295772 | A1 | 11/2010 | Alameh | |
| 2010/0295773 | A1 | 11/2010 | Alameh | |
| 2014/0028575 | A1* | 1/2014 | Parivar | G06F 3/0414 345/173 |
| 2014/0078318 | A1* | 3/2014 | Alameh | G06F 3/0304 348/207.99 |
| 2015/0324078 | A1* | 11/2015 | Dipin | G08C 17/02 715/765 |

FOREIGN PATENT DOCUMENTS

| TW | 201344597 A | 11/2013 |
|---|---|---|
| TW | 201610750 A | 3/2016 |
| TW | I552021 B | 10/2016 |
| TW | I619405 B | 3/2018 |

* cited by examiner

*Primary Examiner* — Abbas I Abdulselam
(74) *Attorney, Agent, or Firm* — Winston Hsu

(57) ABSTRACT

A 3D display includes a screen, a first detecting circuit, a second detecting circuit, and a processing circuit. The first detecting circuit includes multiple first IR sensors disposed above the screen. The second detecting circuit includes multiple second IR sensors disposed below the screen. The processing circuit is configured to receive optical signals of the first and second IR sensors for providing data captured within the scan regions of the first and second detecting circuits, determine whether a gesture is detected according to the data captured within the scan regions of the first and second detecting circuits, calculate the location of one or multiple centroids of the gesture, identify the type of the gesture according to the movement of the one or multiple centroids, and instruct the screen to display a 3D object in a way indicated by the gesture.

9 Claims, 17 Drawing Sheets

3D DISPLAY WITH GESTURE RECOGNITION FUNCTION

CROSS REFERENCE TO RELATED APPLICATION

This application claims priority of Taiwan Application No. 107115893 filed on 2018 May 10.

BACKGROUND OF THE INVENTION

1. Field of the Invention

The present invention provides a 3D display with gesture recognition function, and more particularly, to a low-cost, low-energy and small-sized 3D display with gesture recognition function.

2. Description of the Prior Art

Triangulation-based long-range sensing techniques include microwave, acoustic wave, Infrared, laser and stereoscopy. The idea of providing a 3D display with gesture recognition function has been proposed, but implementing the above-mentioned long-range sensing techniques to achieve this does not result in a marketable product. The reason is that the camera sensing devices are bulky, expensive and consume a lot of energy, thus particularly unsuitable for laptop computers, desktop computers or portable electronic devices.

Therefore, there is a need for a low-cost, low-energy and small-sized 3D display with gesture recognition function

SUMMARY OF THE INVENTION

The present invention provides a 3D display with gesture recognition function. The 3D display includes a screen for displaying a 3D object, a first detecting circuit comprising M first IR sensors disposed above the screen, a second detecting circuit comprising N second IR sensors disposed below the screen, and a processing circuit. The processing circuit is configured to receive optical signals of the M first IR sensors and the N second IR sensors for providing data captured within a scan region of the M first IR sensors and a scan region of the N second IR sensors, determine whether a gesture is detected according to the data captured within the scan region of the M first IR sensors and the data captured within the scan region of the N second IR sensors, calculate a location of one or multiple centroids of the gesture, identify a type of the gesture according to a movement of the one or multiple centroids, and instruct the screen to display the 3D object in a way indicated by the gesture.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
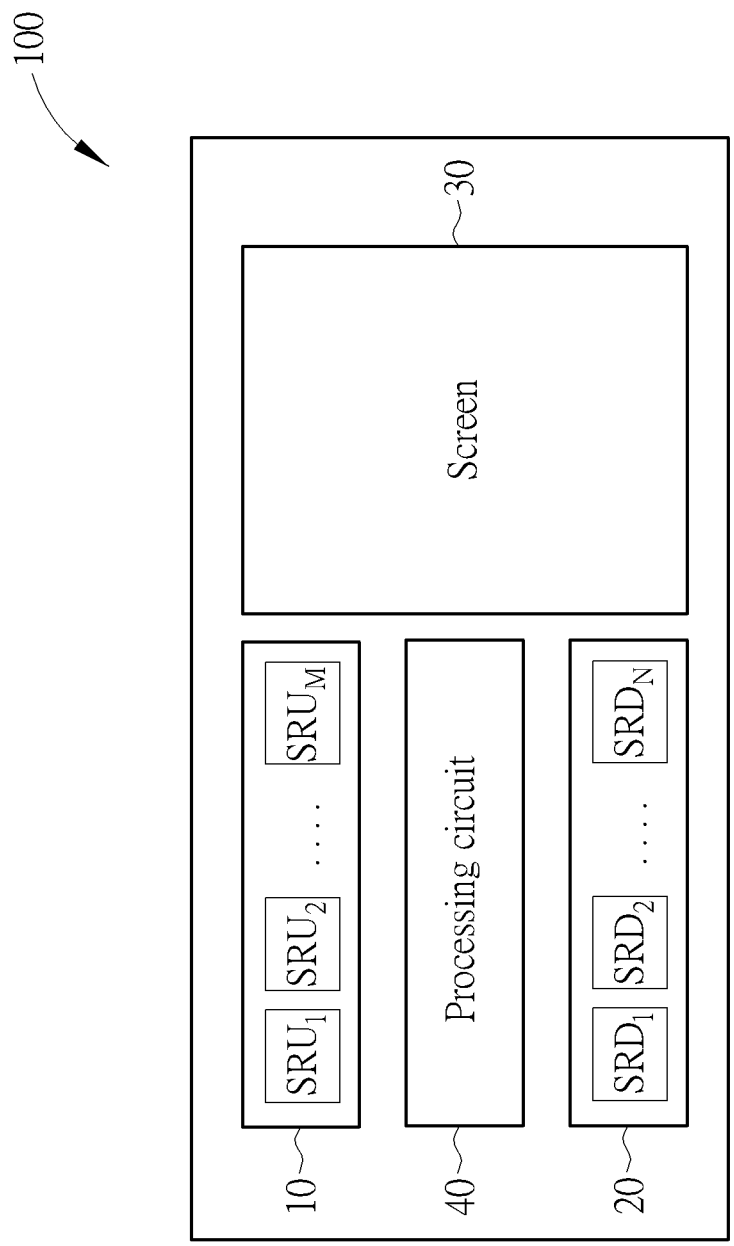
FIG. 1 is a functional diagram illustrating a 3D display with gesture recognition function according to an embodiment of the present invention.

FIG. 1 is a functional diagram illustrating a 3D display 100 with gesture recognition function according to an embodiment of the present invention. The 3D display 100 includes a first detecting circuit 10, a second detecting circuit 20, a screen 30, and a processing circuit 40. The first detecting circuit 10 includes a plurality of infrared radiation (IR) sensors $SRU_1$~$SRU_m$, and the second detecting circuit 20 includes a plurality of IR sensors $SRD_1$~$SRD_N$, wherein M and N are integers larger than 1. The processing circuit 40 is configured to determine whether a gesture is detected and the type of the gesture according to the data captured within the scan region of the first detecting circuit 10 and the data captured the scan region of the second detecting circuit 20, thereby instructing the screen 30 to display a 3D object in a way indicated by the gesture.

In an embodiment of the present invention, the 3D display 100 may be a laptop computer, a desktop computer, a TV, or any portable devices with display function. However, the type of the 3D display 100 does not limit the scope of the present invention.

In an embodiment of the present invention, the processing circuit 40 may be implemented using a processor or an application-specific integrated circuit (ASIC). However, the implementation of the processing circuit 40 does not limit the scope of the present invention.

Figure 2:
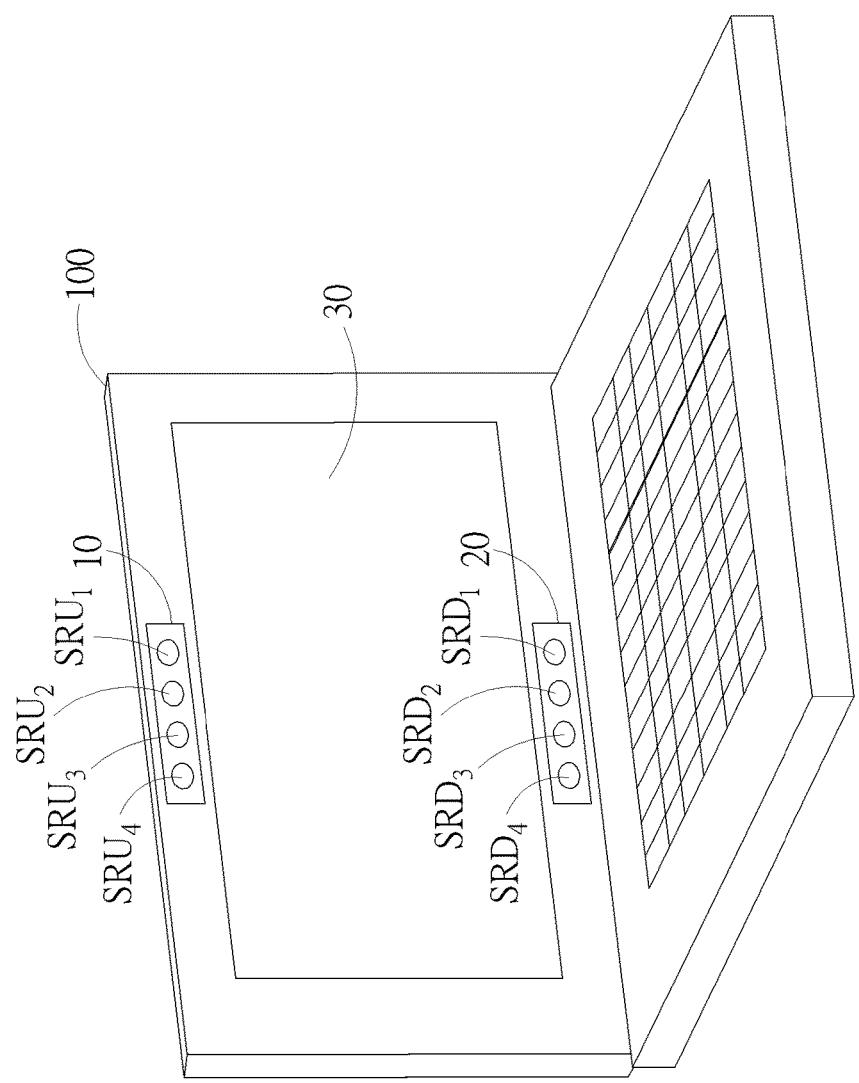
FIG. 2 is a diagram illustrating the 3D display according to an embodiment of the present invention.
Figure 3A:
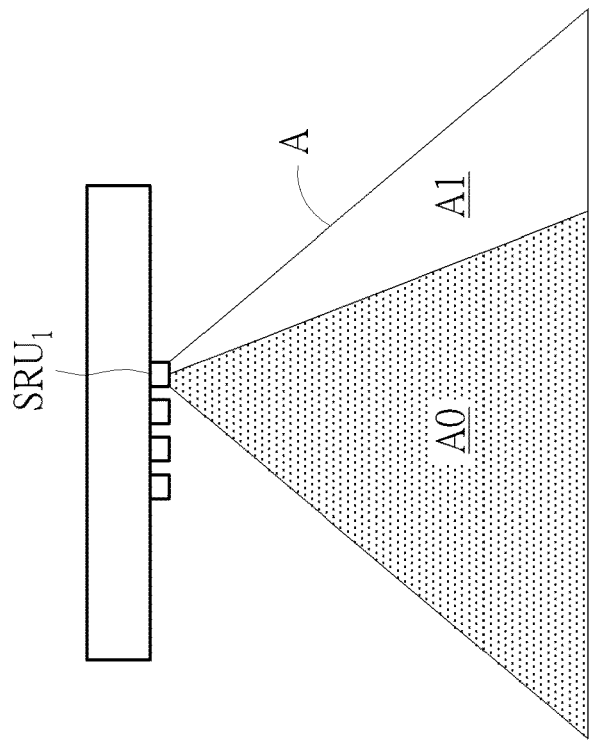
FIGS. 3A~3D are diagrams illustrating the operation of a first detecting circuit in a 3D display according to an embodiment of the present invention.
Figure 3A:
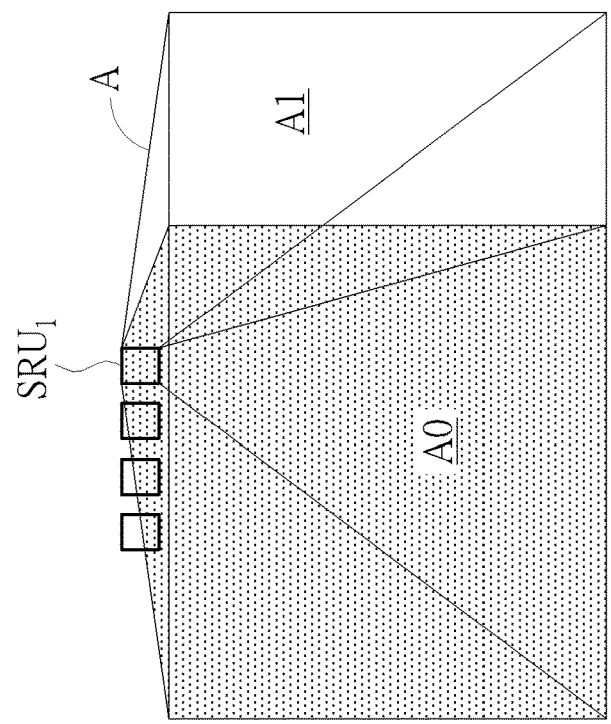
Figure 3B:
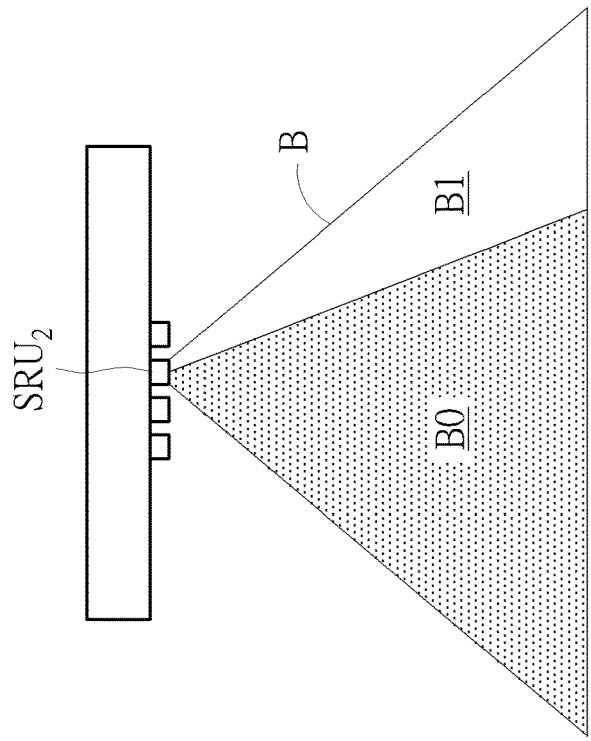
Figure 3B:
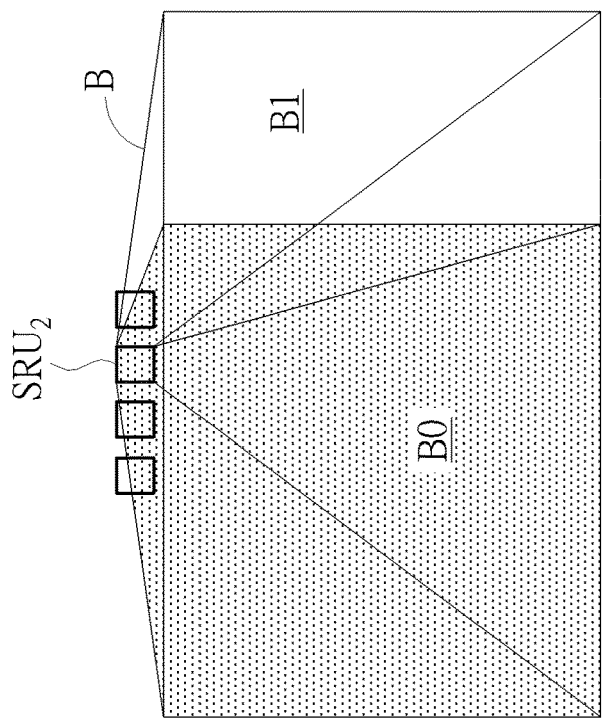
Figure 3C:
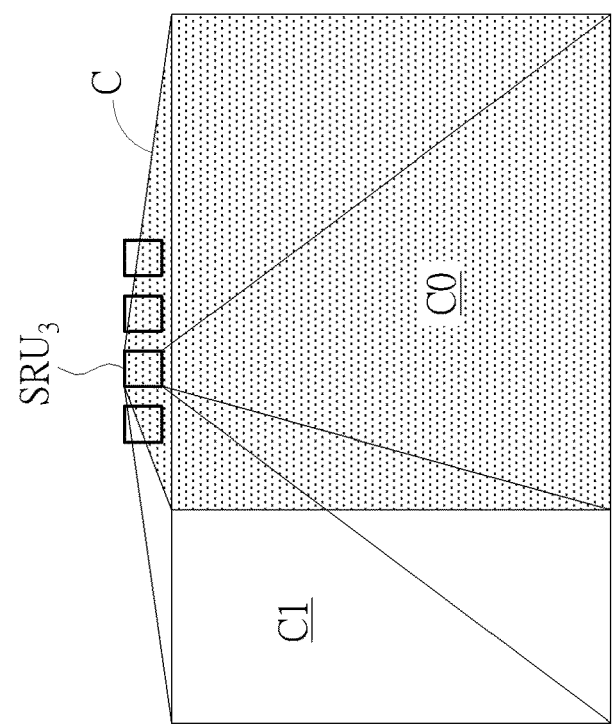
Figure 3C:
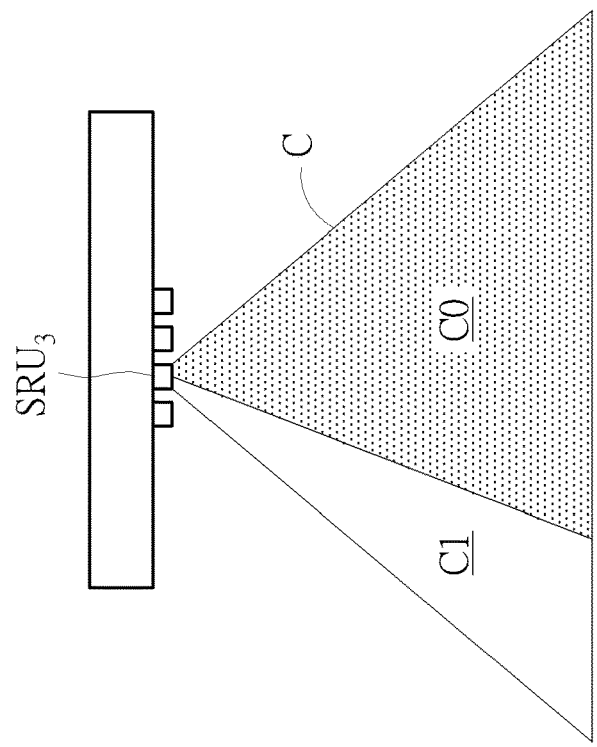
Figure 3D:
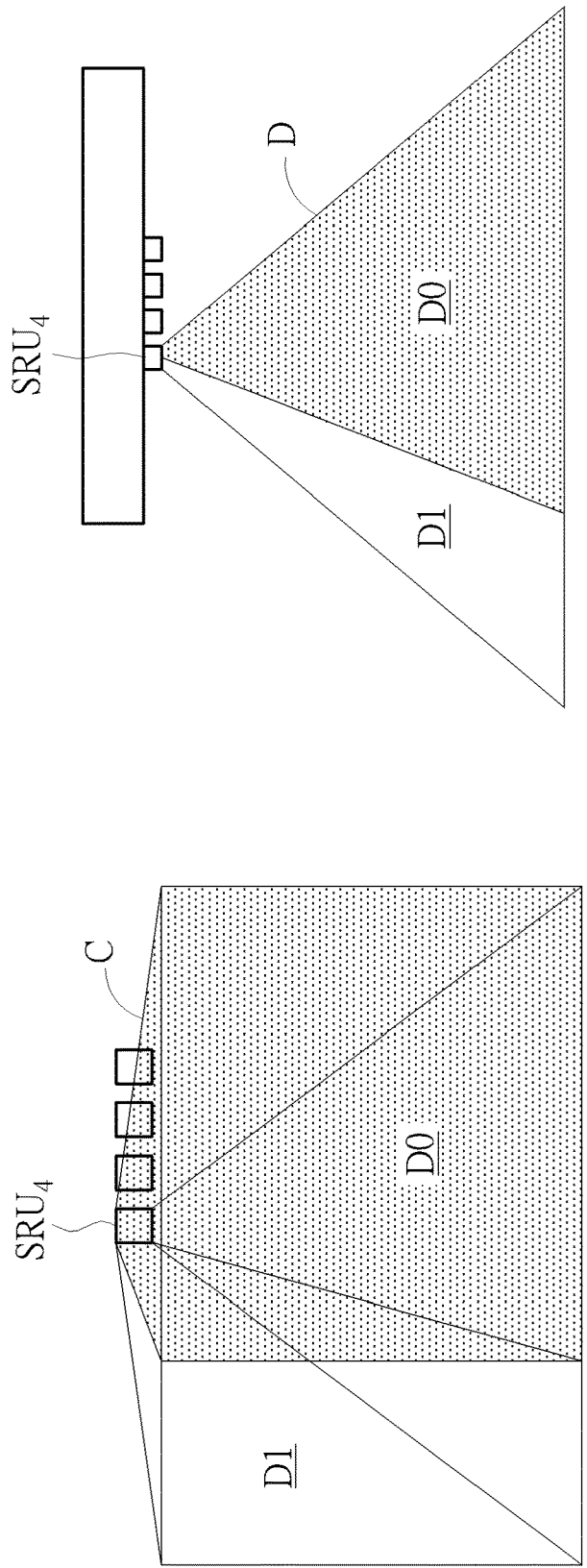
Figure 4A:
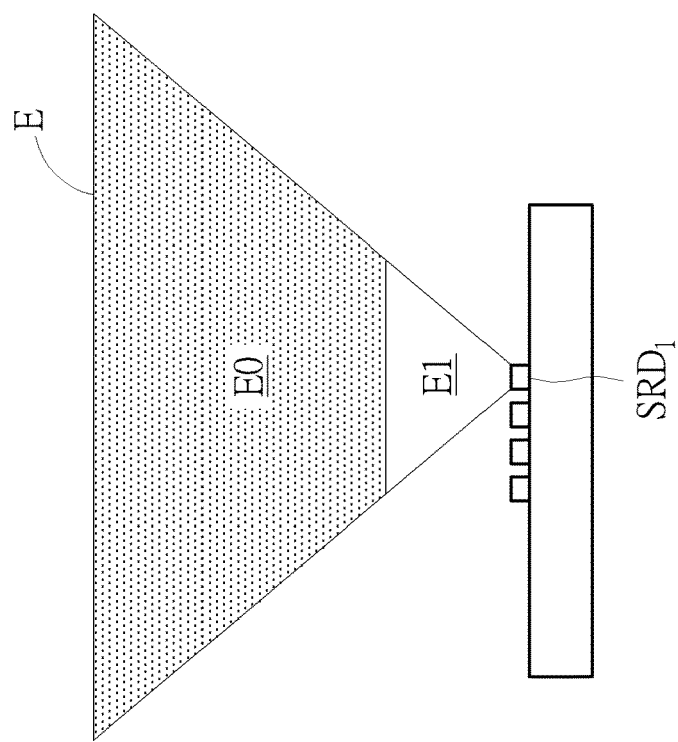
FIGS. 4A~4D are diagrams illustrating the operation of a second detecting circuit in a 3D display according to an embodiment of the present invention.
Figure 4A:
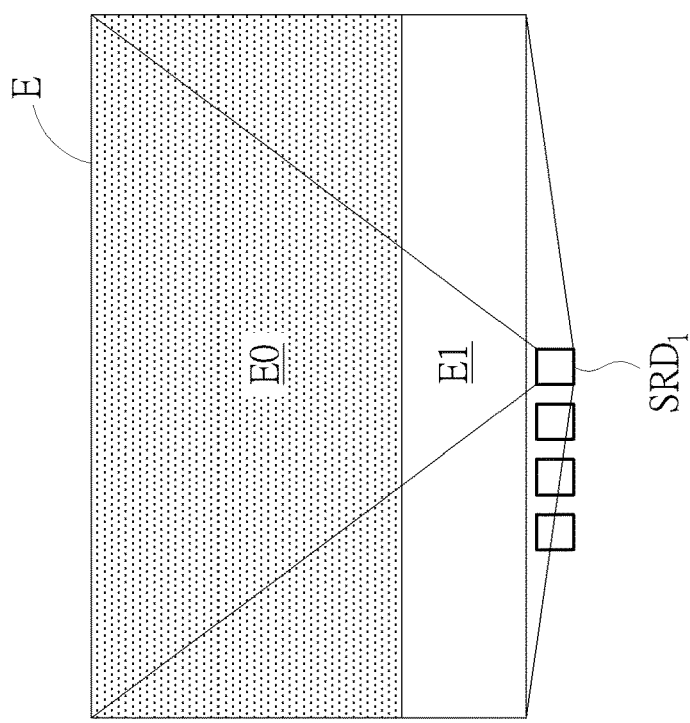
Figure 4B:
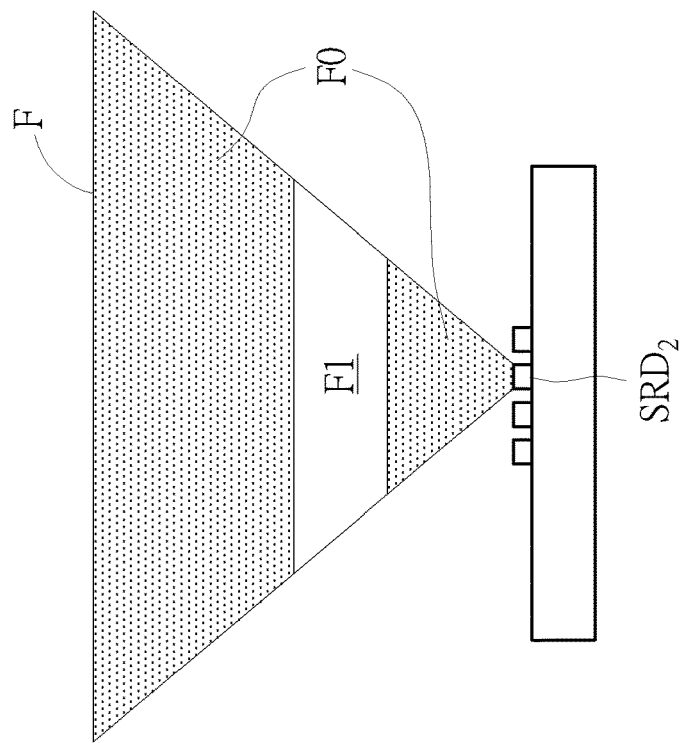
Figure 4B:
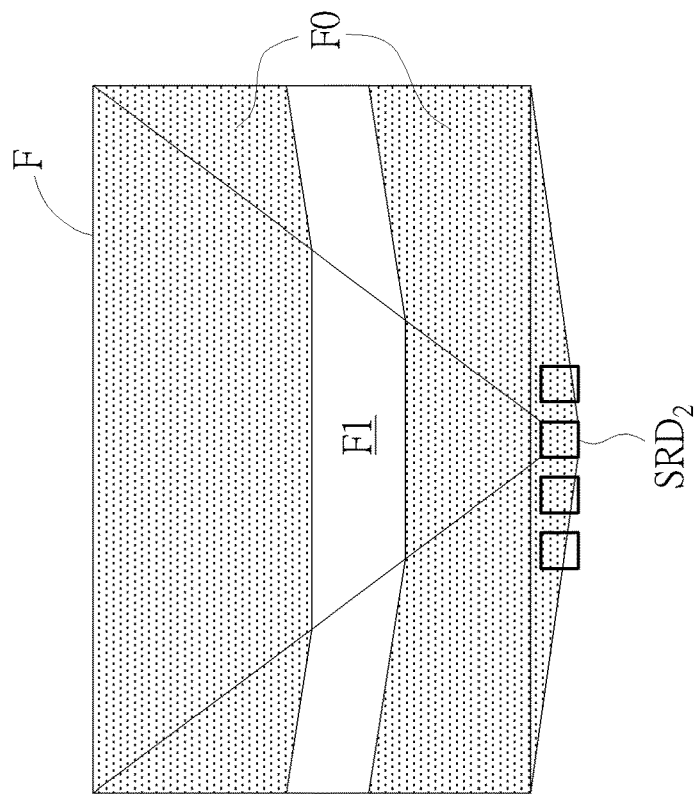
Figure 4C:
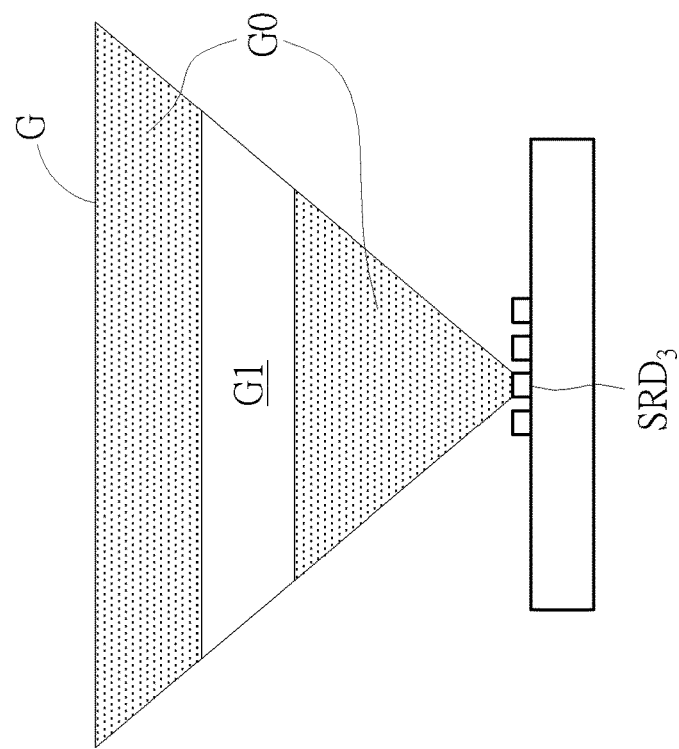
Figure 4C:
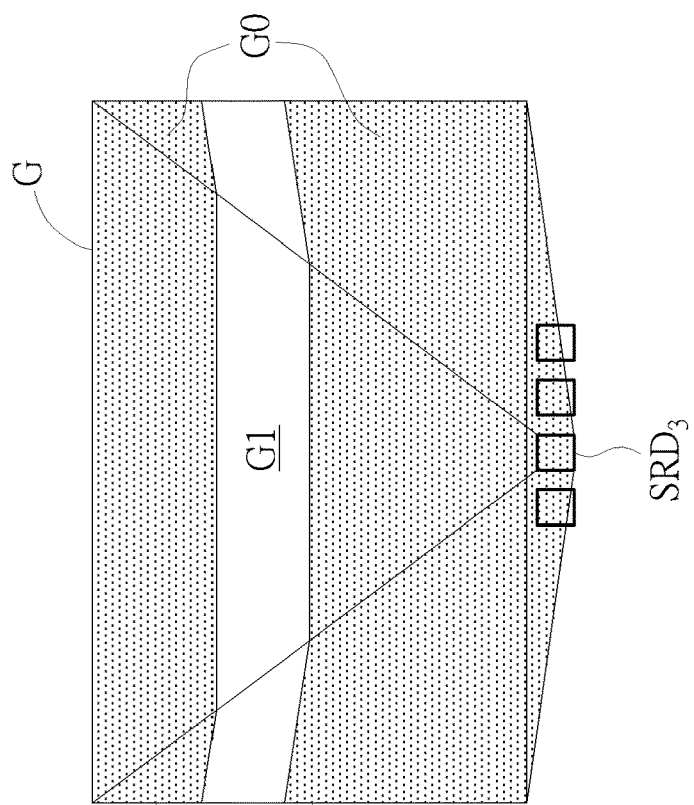
Figure 4D:
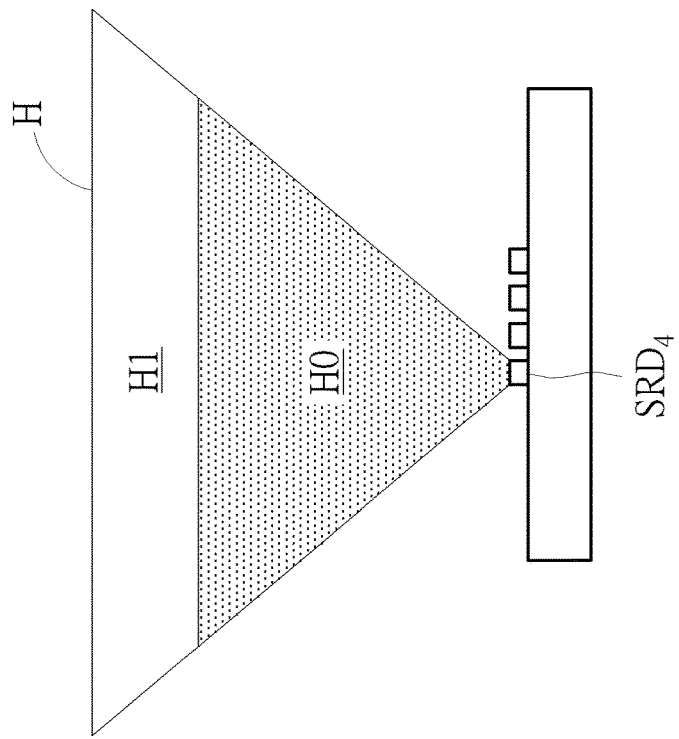
Figure 4D:
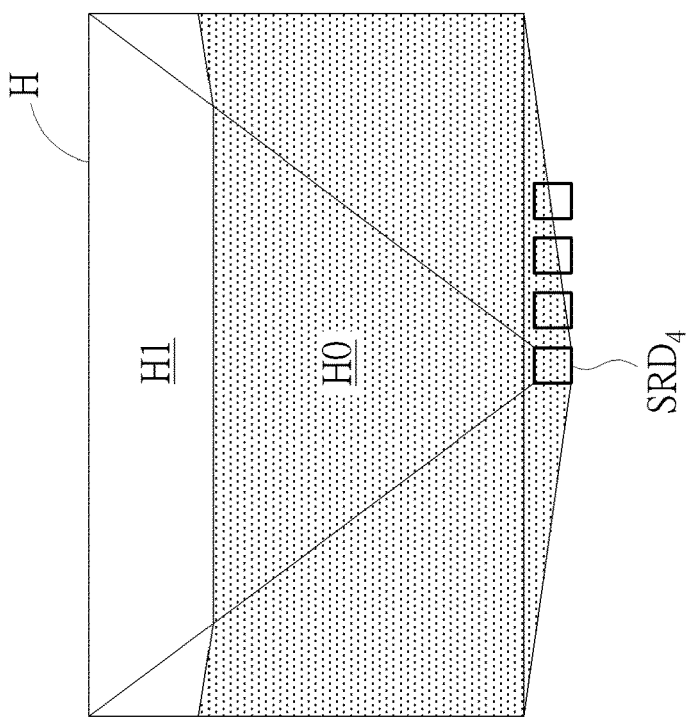

FIG. 2 is a diagram illustrating the 3D display 100 according to an embodiment of the present invention. For illustrative purpose, FIG. 2 depicts the embodiment when M=N=4. However, the values of M and N do not limit the scope of the present invention. In the 3D display 100 illustrated in FIG. 2, the IR sensors $SRU_1$~$SRU_4$ of the first detecting circuit 10 are disposed above the screen 30, and the IR sensors $SRD_1$~$SRD_4$ of the second detecting circuit 20 are disposed below the screen 30.

The present 3D display 100 provides gesture recognition function using time of flight (TOF) technique. The IR sensors of the first detecting circuit 10 and the second detecting circuit 20 provide IR beams which illuminate an object and are then reflected back by the object. The distance of the object may be resolved based on the known speed of light, measuring the time-of-flight of an optical signal between a detecting circuit and the object for each point of the image.

FIGS. 3A~3D are diagrams illustrating the operation of the first detecting circuit 10 according to an embodiment of the present invention. The front-view and the top-view of the scan region A of the IR sensor $SRU_j$ in the first detecting circuit 10 are depicted on the left side and the right side of FIG. 3A, respectively. The front-view and the top-view of the scan region B of the IR sensor $SRU_2$ in the first detecting circuit 10 are depicted on the left side and the right side of FIG. 3B, respectively. The front-view and the top-view of the scan region C of the IR sensor $SRU_3$ in the first detecting circuit 10 are depicted on the left side and the right side of FIG. 3C, respectively. The front-view and the top-view of the scan region B of the IR sensor $SRU_4$ in the first detecting circuit 10 are depicted on the left side and the right side of FIG. 3D, respectively. In the embodiments illustrated in FIGS. 3A~3D, the scan regions A~D are pyramid-shaped regions in front of the screen 30. However, the shapes of the scan regions A~D do not limit the scope of the present invention.

In the embodiment of the present invention, the processing circuit 40 is configured to acquire the scan region image of each IR sensor in the first detecting circuit 10 by filtering the data captured within a corresponding predetermined region from the data captured within the scan region of each IR sensor. More specifically, the scan region A of the IR sensor $SRU_1$ includes an effective scan region A1 and a filtered scan region A0, the scan region B of the IR sensor $SRU_2$ includes an effective scan region B1 and a filtered scan region B0, the scan region C of the IR sensor $SRU_3$ includes an effective scan region C1 and a filtered scan region C0, and the scan region D of the IR sensor $SRU_4$ includes an effective scan region D1 and a filtered scan region D0. The scan region images of the IR sensors $SRU_1$~$SRU_4$ are the data captured within the effective scan regions A1~A4, respectively. In an embodiment, the effective scan regions A1~A4 do not intersect with each other.

FIGS. 4A~4D are diagrams illustrating the operation of the second detecting circuit 20 according to an embodiment of the present invention. The back-view and the top-view of the scan region E of the IR sensor $SRD_1$ in the second detecting circuit 20 are depicted on the left side and the right side of FIG. 4A, respectively. The back-view and the top-view of the scan region F of the IR sensor $SRD_2$ in the second detecting circuit 20 are depicted on the left side and the right side of FIG. 4B, respectively. The back-view and the top-view of the scan region G of the IR sensor $SRD_3$ in the second detecting circuit 20 are depicted on the left side and the right side of FIG. 4C, respectively. The back-view and the top-view of the scan region H of the IR sensor $SRD_4$ in the second detecting circuit 20 are depicted on the left side and the right side of FIG. 4D, respectively. In the embodiments illustrated in FIGS. 4A~4D, the scan regions E~H are pyramid-shaped regions in front of the screen 30. However, the shapes of the scan regions E~H do not limit the scope of the present invention.

In the embodiment of the present invention, the processing circuit 40 is configured to acquire the scan region image of each IR sensor in the second detecting circuit 20 by filtering the data captured within a corresponding predetermined region from the data captured within the scan region of each IR sensor. More specifically, the scan region E of the IR sensor $SRD_1$ includes an effective scan region E1 and a filtered scan region E0, the scan region F of the IR sensor $SRD_2$ includes an effective scan region F1 and a filtered scan region F0, the scan region G of the IR sensor $SRD_3$ includes an effective scan region G1 and a filtered scan region G0, and the scan region H of the IR sensor $SRD_4$ includes an effective scan region H1 and a filtered scan region H0. The scan region images of the IR sensors $SRD_1$~$SRD_4$ are the data captured within the effective scan regions E1~H4, respectively. In an embodiment, the effective scan regions E1~H4 do not intersect with each other.

Figure 5:
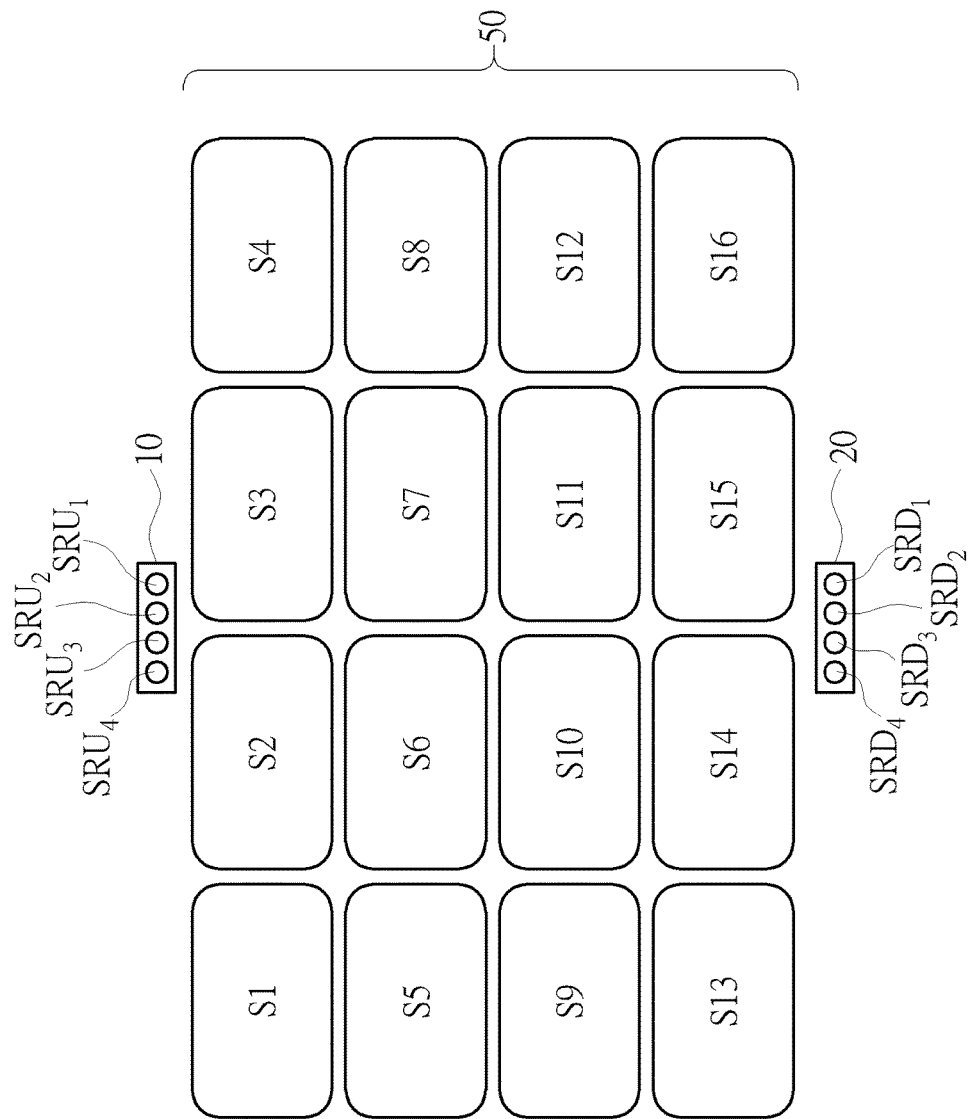
FIG. 5 is a diagram illustrating a scan region of a first detecting circuit and a second detecting circuit in a 3D display according to an embodiment of the present invention.

In the embodiment of the present invention, the sizes of the effective scan region and the filtered scan region in each scan region may be determined by the values of M and N. FIG. 5 depicts the scan region 50 of the first detecting circuit 10 and the second detecting circuit 50, wherein the area of the scan region 50 is associated with the area of the screen 30. In the embodiment of M=N=4 illustrated above, the scan region 50 includes 16 sub-regions S1~S16, wherein each sub-region is a union set of the scan region image of an IR sensor in the first detecting circuit 10 and the scan region image of an IR sensor in the second detecting circuit 20. In other words, when the processing circuit 40 detects a gesture based on the data captured by the first detecting circuit 10 and the second detecting circuit 20, the centroid movement of the gesture may be detected by a corresponding IR sensor in the first detecting circuit 10 and a corresponding IR sensor in the second detecting circuit 20. For example, the centroid movement within the sub-region S4 is monitored by the IR sensor $SRU_1$ in the first detecting circuit 10 and the IR sensor $SRD_4$ in the second detecting circuit 20; the centroid movement within the sub-region S11 is monitored by the IR sensor $SRU_2$ in the first detecting circuit 10 and the IR sensor $SRD_2$ in the second detecting circuit 20.

Figure 6:
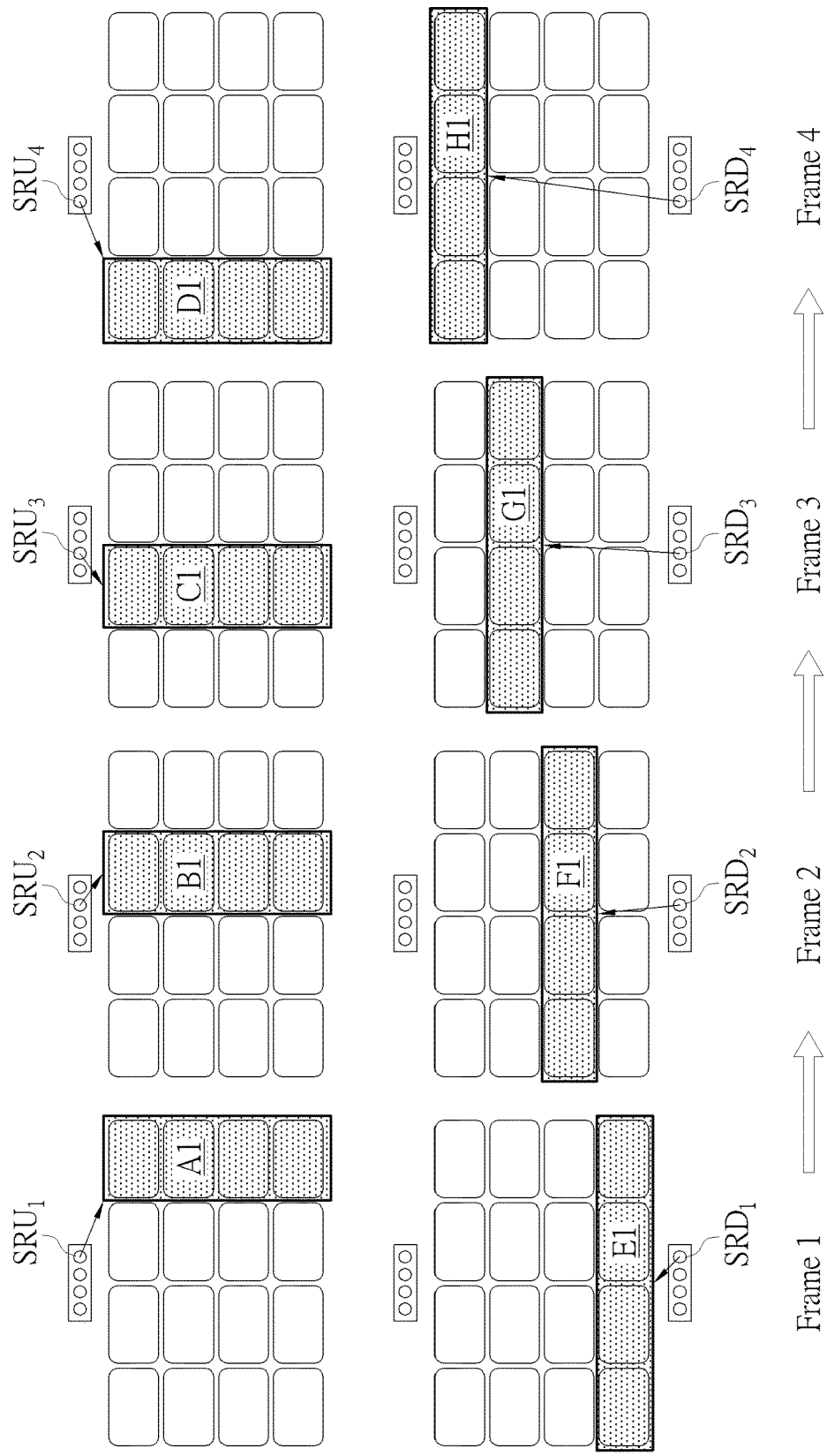
FIG. 6 is a diagram illustrating a scan method of a first detecting circuit and a second detecting circuit in a 3D display according to an embodiment of the present invention.
Figure 7:
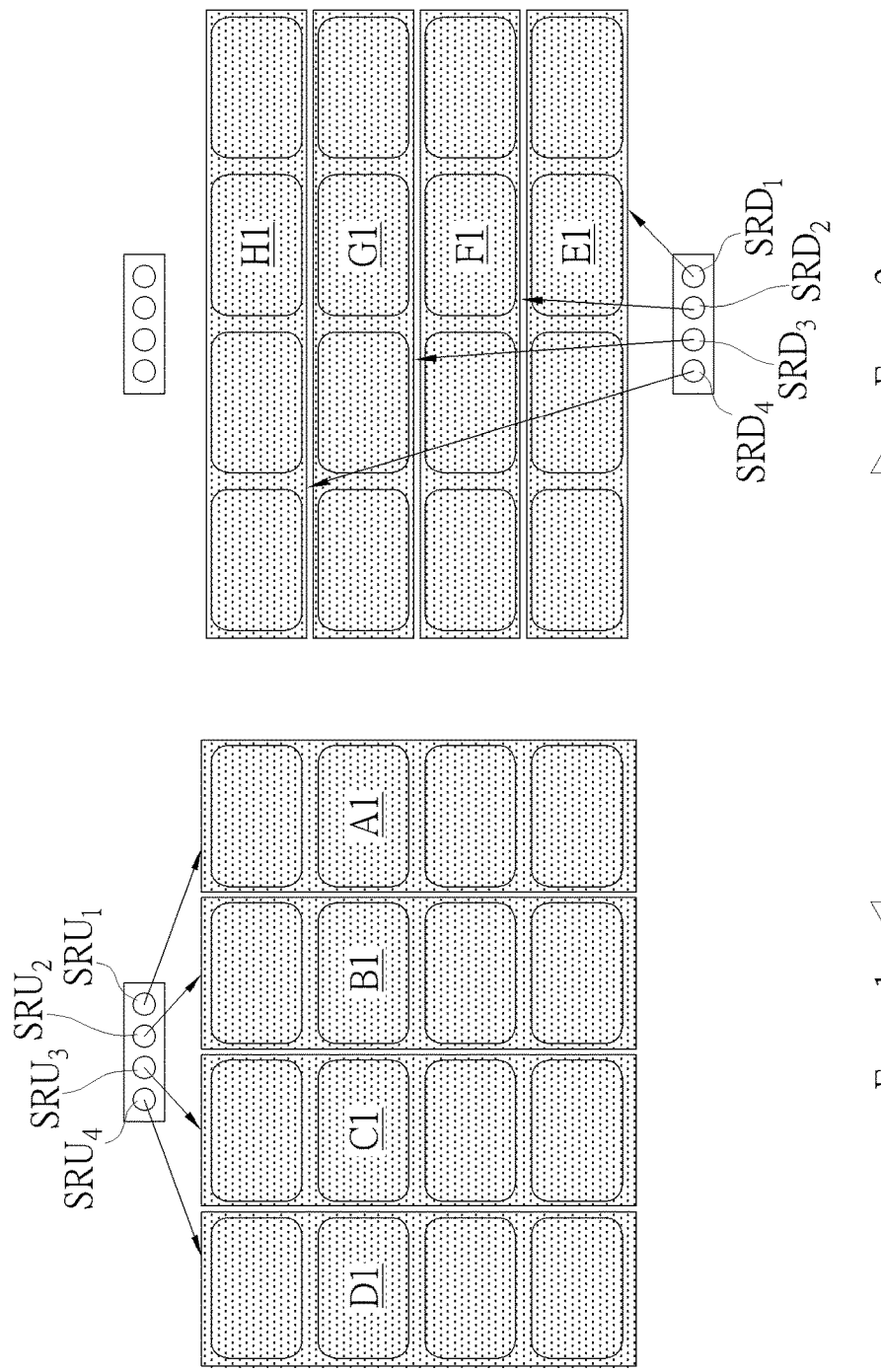
FIG. 7 is a diagram illustrating a scan method of a first detecting circuit and a second detecting circuit in a 3D display according to another embodiment of the present invention.

FIG. 6 and FIG. 7 are diagrams illustrating the scan methods of the first detecting circuit 10 and the second detecting circuit according to embodiments of the present invention. In the embodiment depicted in FIG. 6, the IR sensor $SRU_1$ in the first detecting circuit 10 is configured to acquire the data captured within the effective scan region A1 and the IR sensor $SRD_1$ in the second detecting circuit 20 is configured to acquire the data captured with in the effective scan region E1 during frame 1, the IR sensor $SRU_2$ in the first detecting circuit 10 is configured to acquire the data captured with in the effective scan region B1 and the IR sensor $SRD_2$ in the second detecting circuit 20 is configured to acquire the data captured with in the effective scan region F1 during frame 2, the IR sensor $SRU_3$ in the first detecting circuit 10 is configured to acquire the data captured with in the effective scan region C1 and the IR sensor $SRD_3$ in the second detecting circuit 20 is configured to acquire the data captured with in the effective scan region G1 during frame 3, and the IR sensor $SRU_4$ in the first detecting circuit 10 is configured to acquire the data captured with in the effective scan region D1 and the IR sensor $SRD_4$ in the second detecting circuit 20 is configured to acquire the data captured with in the effective scan region H1 during frame 4. In the embodiment depicted in FIG. 7, the IR sensors $SRU_1$~$SRU_4$ in the first detecting circuit 10 are configured to respective acquire the data captured within the effective scan regions A1, B1, C1 and D1 during frame 1, and the IR sensors $SRD_1$~$SRD_4$ in the second detecting circuit 20 are configured to respective acquire the data captured within the effective scan regions E1, F1, G1 and H1 during frame 2. However, the scan method of the first detecting circuit 10 or the second detecting circuit 20 does not limit the scope of the present invention.

Figure 8:
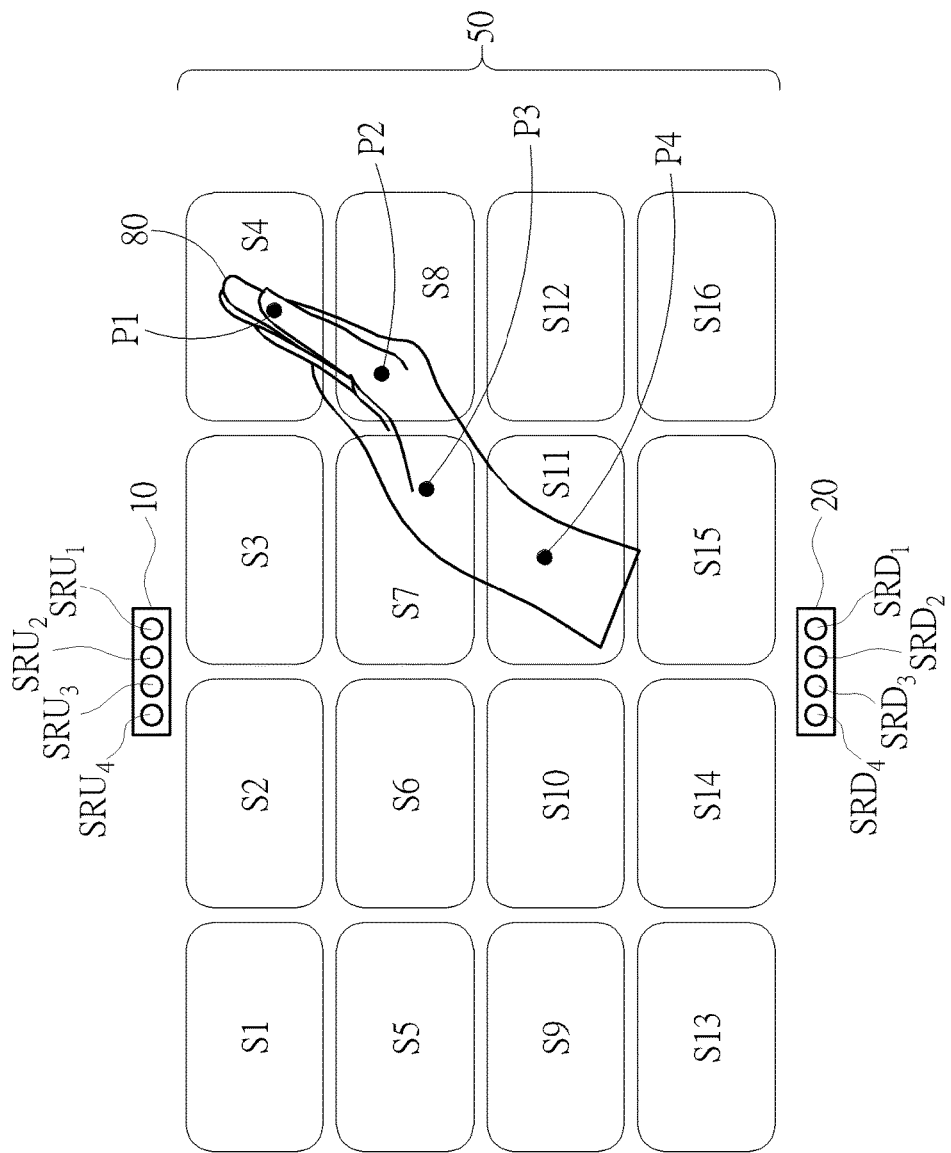
FIG. 8 is a diagram illustrating the operation of a first detecting circuit and a second detecting circuit in a 3D display according to an embodiment of the present invention.

FIG. 8 is a diagram illustrating the operation of the first detecting circuit 10 and the second detecting circuit 20 according to an embodiment of the present invention. Assuming that a palm 80 of a user appears in the scan region 50, the first detecting circuit and the second detecting circuit 20 may detect 4 centroid coordinates P1~P4. The centroid coordinate P1 located in the sub-region S4 is acquired according to the data captured within the effective scan region A1 of the IR sensor $SRU_1$ in the first detecting circuit 10 and the data captured within the effective scan region H1 of the IR sensor $SRD_4$ in the second detecting circuit 20. The centroid coordinate P2 located in the sub-region S8 is acquired according to the data captured within the effective scan region A1 of the IR sensor $SRU_1$ in the first detecting circuit 10 and the data captured within the effective scan region G1 of the IR sensor $SRD_3$ in the second detecting circuit 20. The centroid coordinate P3 located in the sub-region S7 is acquired according to the data captured within the effective scan region B1 of the IR sensor $SRU_2$ in the first detecting circuit 10 and the data captured within the effective scan region G1 of the IR sensor $SRD_3$ in the second detecting circuit 20. The centroid coordinate P4 located in the sub-region S11 is acquired according to the data captured within the effective scan region B1 of the IR sensor $SRU_2$ in the first detecting circuit 10 and the data captured within the effective scan region F1 of the IR sensor $SRD_2$ in the second detecting circuit 20.

Figure 9A:
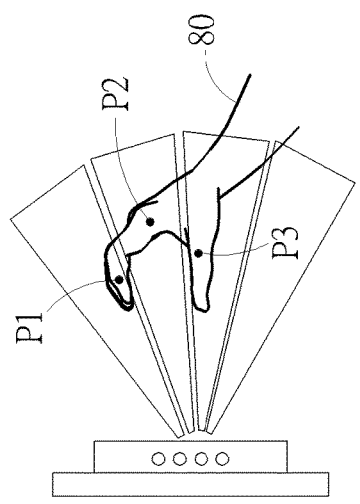
FIGS. 9A~9D are diagrams illustrating the gesture detection of a first detecting circuit and a second detecting circuit in a 3D display according to an embodiment of the present invention.
Figure 9B:
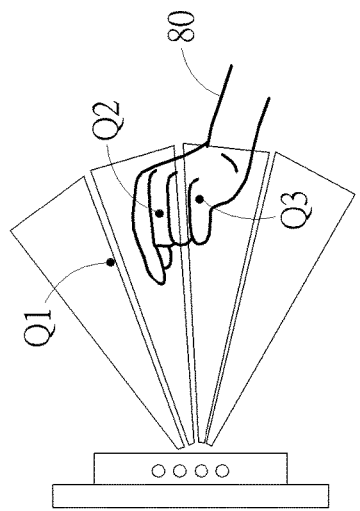
Figure 9C:
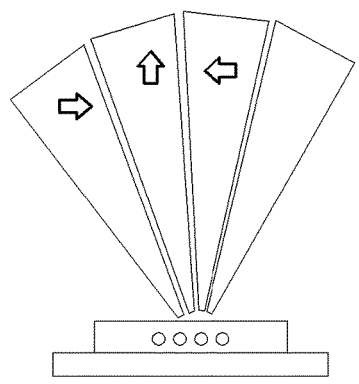
Figure 9D:
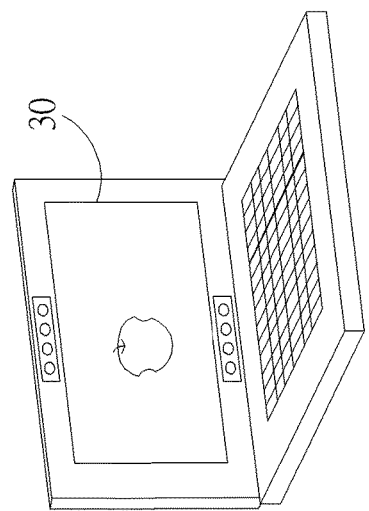

FIGS. 9A~9D are diagrams illustrating the gesture detection of the first detecting circuit 10 and the second detecting circuit 20 according to an embodiment of the present invention. FIG. 9A and FIG. 9B depict the process of the palm 80 issuing an grab gesture, wherein FIG. 9A depicts the coordinates P1~P3 of the first to the third centroids detected by the first detecting circuit 10 and the second detecting circuit 20 during an initial stage of the grab gesture, and FIG. 9B depicts the coordinates Q1~Q3 of the first to the third centroids detected by the first detecting circuit 10 and the second detecting circuit 20 during a final stage of the grab gesture. According to the location changes between the coordinates P1~P3 and Q1~Q3, the processing circuit 40 may determine the moving direction of each centroid, wherein the first centroid and the second centroid move towards each other and the third centroid moves away from the screen 30, as depicted by the arrows in FIG. 9C. According to the moving direction of each centroid, the processing circuit 40 may determine that the palm 80 is issuing a grab gesture, thereby instructing the screen 30 to display a compressed object as if being snatched, as depicted in FIG. 9D.

Figure 10A:
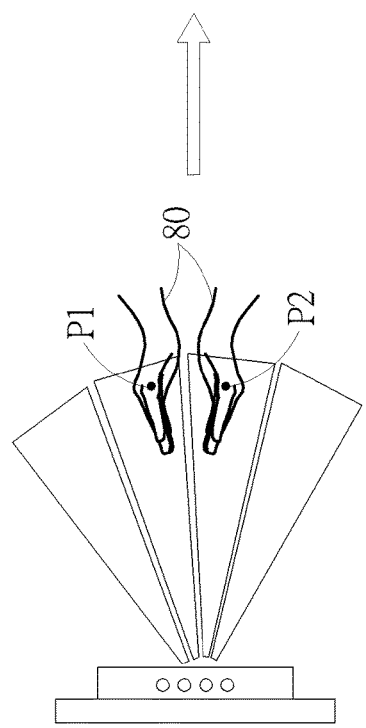
FIGS. 10A~10D are diagrams illustrating the gesture detection of the first detecting circuit and a second detecting circuit in a 3D display according to another embodiment of the present invention.
Figure 10B:
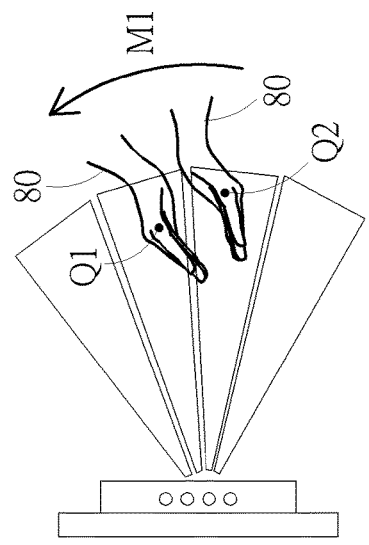
Figure 10C:
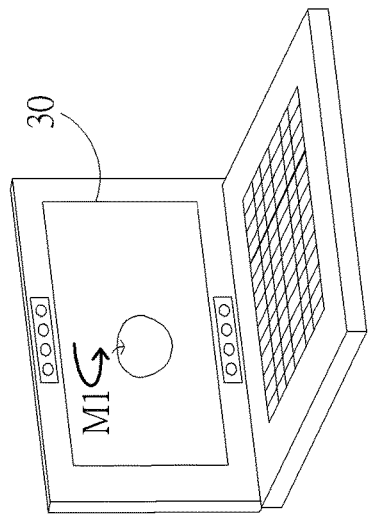
Figure 10D:
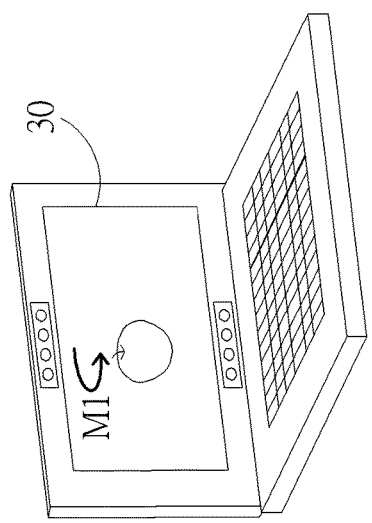

FIGS. 10A~10D are diagrams illustrating the gesture detection of the first detecting circuit 10 and the second detecting circuit 20 according to an embodiment of the present invention. FIG. 10A and FIG. 10B depict the process of the palm 80 issuing an rotate gesture, wherein FIG. 10A depicts the coordinates P1~P2 of the first and the second centroids detected by the first detecting circuit 10 and the second detecting circuit 20 during an initial stage of the rotate gesture, and FIG. 10B depicts the coordinates Q1~Q2 of the first and the second centroids detected by the first detecting circuit 10 and the second detecting circuit 20 during a final stage of the rotate gesture. According to the location changes between the coordinates P1~P2 and Q1~Q2, the processing circuit 40 may determine the moving direction of each centroid, wherein the distance between the first centroid and the second centroid remains substantially unchanged, the first centroid moves away from the screen 30, and the second centroid moves towards from the screen 30, as depicted by the arrows in FIG. 10C. According to the moving direction of each centroid, the processing circuit 40 may determine that the palm 80 is issuing a rotate gesture, thereby instructing the screen 30 to display a 3D object rotating in the direction Ml indicated by the rotate gesture, as depicted in FIG. 10D.

Figure 11A:
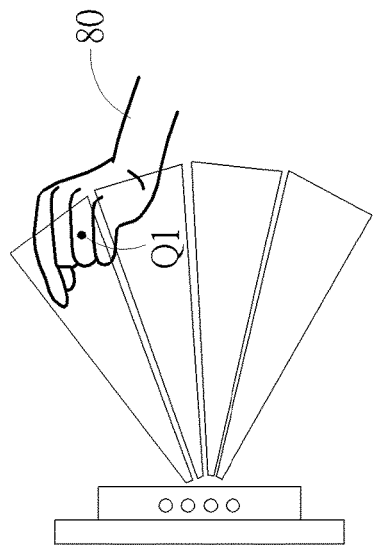
FIGS. 11A~11D are diagrams illustrating the gesture detection of a first detecting circuit and a second detecting circuit in a 3D display according to another embodiment of the present invention.
Figure 11B:
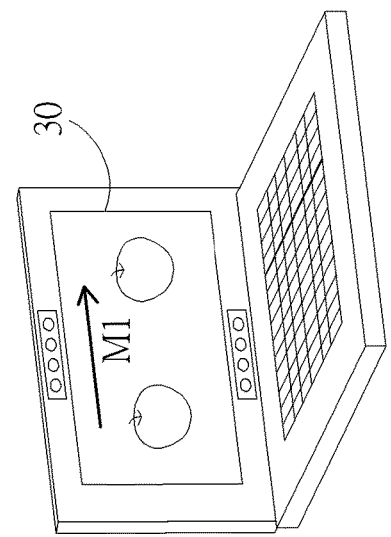
Figure 11C:
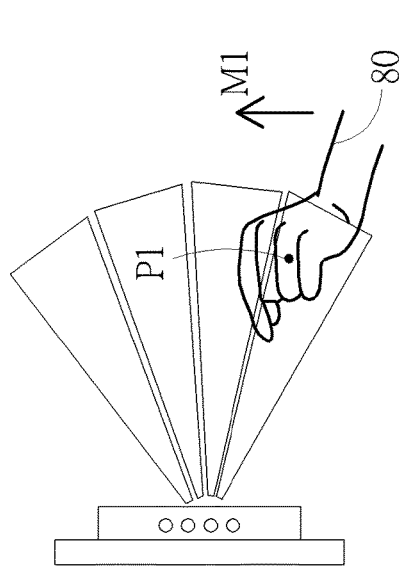
Figure 11D:
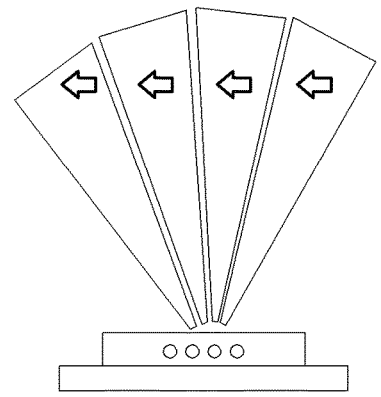

FIGS. 11A~11D are diagrams illustrating the gesture detection of the first detecting circuit 10 and the second detecting circuit 20 according to an embodiment of the present invention. FIG. 11A and FIG. 11B depict the process of the palm 80 issuing a slide gesture, wherein FIG. 11A depicts the coordinate P1 of the first centroid detected by the first detecting circuit 10 and the second detecting circuit 20 during an initial stage of the slide gesture, and FIG. 11B depicts the coordinate Q1 of the first centroid detected by the first detecting circuit 10 and the second detecting circuit 20 during a final stage of the slide gesture. According to the location change between the coordinates P1 and Q1, the processing circuit 40 may determine the moving direction of each centroid, wherein the distance between the first centroid and the screen 30 remains substantially unchanged, but the first centroid moves from one side of the screen to the other side of the screen 30, as depicted by the arrows in FIG. 11C. According to the moving direction of each centroid, the processing circuit 40 may determine that the palm 80 is issuing a slide gesture, thereby instructing the screen 30 to display a 3D object moving in the direction Ml indicated by the slide gesture, as depicted in FIG. 11D.

In conclusion, the present 3D display adopts low-cost, low-energy and small-sized IR sensors for detecting the location of a gesture. With the IR sensors disposed at various location and using time division multiplexing scanning, a scan region associated the area of a screen may be divided into multiple sub-regions for identifying the movement of the gesture, thereby determining the type of the gesture for instructing the screen to display a 3D object in a way indicated by the gesture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A 3D display with gesture recognition function, comprising:
    a screen for displaying a 3D object;
    a first detecting circuit comprising M first infrared radiation (IR) sensors disposed above the screen, wherein M is an integer larger than 1;
    a second detecting circuit comprising N second IR sensors disposed below the screen, wherein N is an integer larger than 1; and
    a processing circuit configured to:
        receive optical signals of the M first IR sensors and the N second IR sensors for providing data captured within a scan region of the M first IR sensors and a scan region of the N second IR sensors;

determine whether a gesture is detected according to the data captured within the scan region of the M first IR sensors and the data captured within the scan region of the N second IR sensors;

calculate a location of one or multiple centroids of the gesture;

identify a type of the gesture according to a movement of the one or multiple centroids; and instruct the screen to display the 3D object in a way indicated by the gesture.

2. The 3D display of claim 1, wherein the processing circuit is further configured to:

acquiring M scan region images of the M first IR sensors by filtering data captured within M first predetermined regions from the data captured within the scan region of the M first IR sensors;

acquiring N scan region images of the N second IR sensors by filtering data captured within N second predetermined regions from the data captured within the scan region of the N second IR sensors;

acquiring M×N sub-regions by finding union sets of the scan region image of each first IR sensor among the M first IR sensors and the scan region image of each second IR sensor among the N second IR sensors; and calculate the location of the one or multiple centroids of the gesture according to which of the M×N sub-regions contains the gesture.

3. The 3D display of claim 2, wherein the M scan region images of the M first IR sensors do not intersect with the N scan region images of the N second IR sensors.

4. The 3D display of claim 1, wherein the M first IR sensors are configured to perform scanning during a first frame, and the N second IR sensors are configured to perform scanning during a second frame.

5. The 3D display of claim 1, wherein the M first IR sensors are configured to sequentially perform scanning during a first frame to an $M^{th}$ frame, and the N second IR sensors are configured to sequentially perform scanning during the first frame to an $N^{th}$ frame, and M is equal to N.

6. The 3D display of claim 1, wherein the M scan region images of the M first IR sensors are first pyramid-shaped regions in front of the screen and the N scan region images of the N second IR sensors are second pyramid-shaped regions in front of the screen.

7. The 3D display of claim 1, wherein:

the processing circuit is further configured to:

determine moving directions of a first centroid, a second centroid and a third centroid of the gesture after having calculated locations of the first centroid, the second centroid and the third centroid of the gesture; and determine that the gesture is a grab gesture when the first centroid and the third centroid move towards each other and the second centroid moves away from the screen; and the second centroid is located between the first centroid and the third centroid.

8. The 3D display of claim 1, wherein the processing circuit is further configured to:

determine moving directions of a first centroid and a second centroid of the gesture after having calculated locations of the first centroid and the second centroid; and determine that the gesture is a rotate gesture when a distance between the first centroid and the second centroid remains unchanged and the second centroid moves towards from the screen.

9. The 3D display of claim 1, wherein the processing circuit is further configured to:

determine moving directions of a first centroid of the gesture after having calculated a location of the first centroid; and determine that the gesture is a slide gesture when a distance between the first centroid and the screen remains unchanged and the first centroid moves from a first side of the screen to a second side of the screen.

* * * * *